May 12, 1953  R. AUBREY, JR., ET AL  2,637,907
EXTENSOMETER FOR CYLINDRICAL MEMBERS
Filed Nov. 30, 1946  3 Sheets-Sheet 1
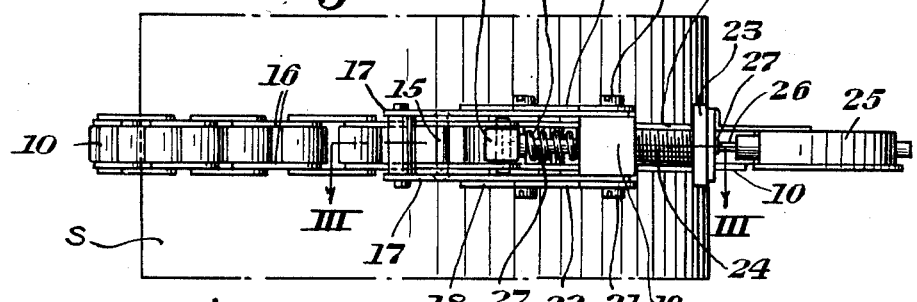
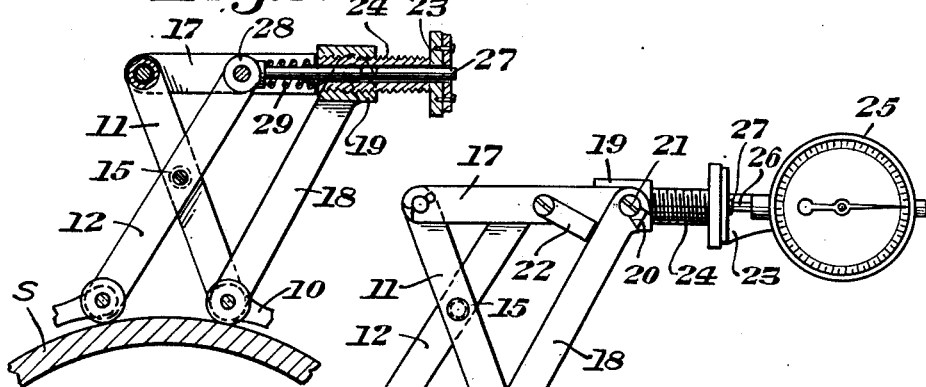
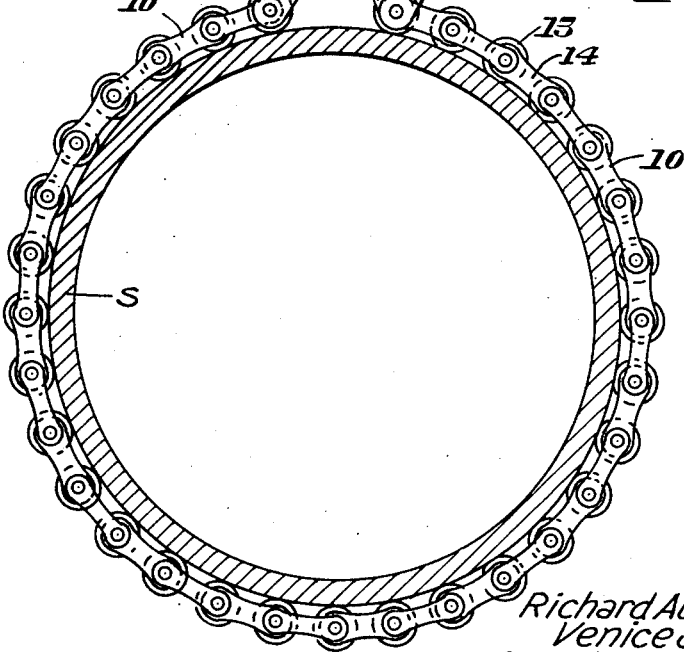
INVENTOR
Richard Aubrey, Jr. and
Venice J. Aubrey
by their attorneys
Stebbins, Blenko & Webb May 12, 1953 R. AUBREY, JR., ET AL 2,637,907
EXTENSOMETER FOR CYLINDRICAL MEMBERS
Filed Nov. 30, 1946 3 Sheets-Sheet 2

INVENTOR
Richard Aubrey, Jr. and
Venice J. Aubrey
by their attorneys
Stebbins, Blenko & Webb

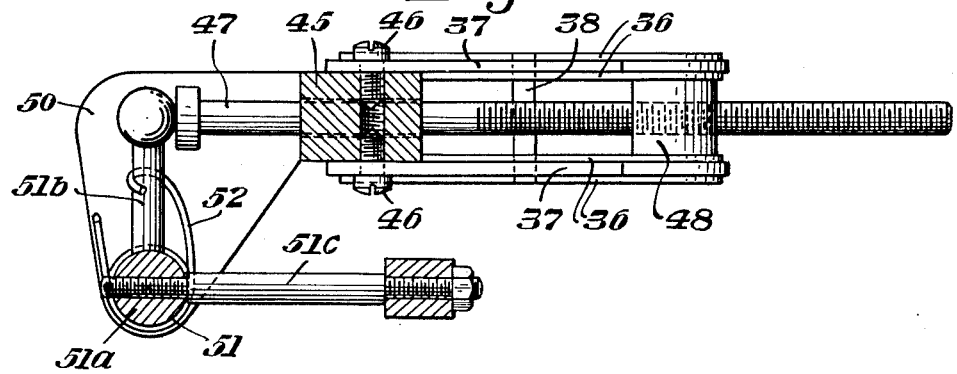
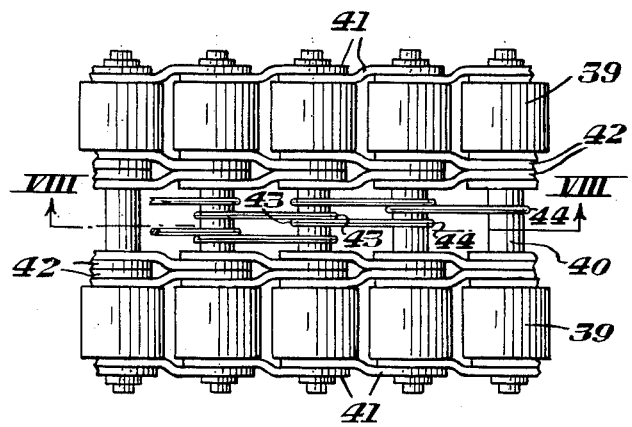
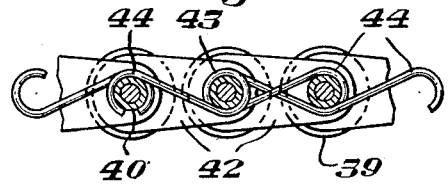

Patented May 12, 1953

2,637,907

UNITED STATES PATENT OFFICE 2,637,907

EXTENSOMETER FOR CYLINDRICAL MEMBERS

Richard Aubrey, Jr., and Venice J. Aubrey, Boardman Township, Mahoning County, Ohio, assignors to The Youngstown Sheet & Tube Company, Youngstown, Ohio, a corporation of Ohio Application November 30, 1946, Serial No. 713,209

9 Claims. (Cl. 33—179)

1

This invention relates generally to the art of testing and, in particular, to an extensometer for indicating transverse strain in a cylindrical member subjected to stress, whether internal or external.

It is universal practice in the manufacture of pipe to subject it to pressure tests but, so far as we are aware, no attempt has been made heretofore to determine the transverse yield point by such tests. For this purpose, it has been the practice to rely on tension tests on coupons cut from the pipe and straightened before pulling. This practice does not give the transverse yield strength accurately because of the error introduced by the cold work on the specimen necessary to straighten it before pulling.

We have invented an extensometer for indicating strain in cylindrical members whereby the transverse yield strength of pipe or the like may be accurately determined as a result of pressure tests, whether internal or external. In a preferred embodiment, we employ a flexible member such as a length of roller chain adapted to be disposed in circumferential engagement with a test specimen, and a pair of levers pivoted together, one end of each lever being pivoted to an end of the length of chain. Cooperating means are pivoted to the other ends of the levers for actuating indicating means such as a dial gage or an electrical stress-strain recorder. The extensometer for use internally of the specimen has springs on the links of its chain for urging the latter outwardly into engagement with the specimen.

A complete understanding of the invention may be obtained from the following detailed description and explanation which refer to the accompanying drawings illustrating preferred embodiments. In the drawings, Figure 1 is a transverse section through a cylindrical specimen showing the invention applied thereto, in elevation;

Figure 2 is a plan view;

Figure 3 is a partial section taken along the plane of line III—III of Figure 2;

Figure 6 is a horizontal section taken along the plane of line VI—VI of Figure 4;

Figure 7 is a plan view showing a portion of the chain; and

Figure 8 is a partial section taken along the plane of line VIII—VIII of Figure 7.

2

Figure 4:
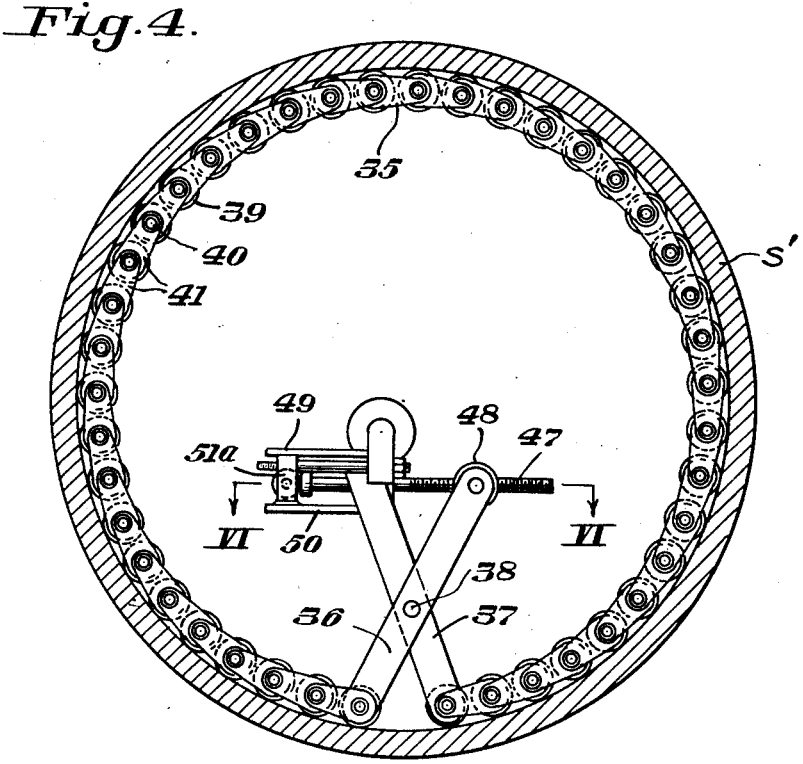
Figure 4 is a view similar to Figure 1 showing the form of the invention adapted for use inside a specimen.

Referring now in detail to the drawings and, in particular, to Figures 1 through 3, the extensometer there shown is intended to be applied externally to a cylindrical specimen S which may, for example, be a length of pipe. The extensometer comprises a length of chain 10 adapted to be disposed about the specimen, the end of the chain being pivoted to levers 11 and 12 which are pivoted together intermediate their ends on a pin 15. The chain is of the roller type including rollers 13 connected together by links 14. One of the links such as that designated 16 is a frangible link for a purpose which will appear later. Each of the levers 11 and 12 includes a pair of bars which are spaced apart by the rollers 13 at the ends of the chain.

Links 17 and 18 are pivoted to the ends of lever 11. Each of the links 17 also is composed of a pair of spaced bars. A block 19 is pivoted to the bars forming the links 17. The bars of the link 18 are notched as at 20 to permit them to be disassociated from the pivot screws of the block 19 indicated at 21. Keepers 22 pivoted to the link 17 normally hold the link 18 in engagement with the screws 21.

A bracket 23 has a stem 24 threaded into the block 19. Indicating means such as a dial gage 25 is mounted on the bracket 23. The gage has an actuating plunger 26. The stem 24 has a central bore therethrough. A pin 27 extends through this bore and is adapted to engage the plunger 26 of the gage 25. The pin has a head 28 thereon by which it is pivoted to the end of the lever 12 opposite that connected to the chain. A compression spring 29 engages the head 28 and the end of the stem 24.

With the parts assembled in the relation shown in Figures 1 through 3, the spring 29 holds the chain 10 taut around the specimen S. The stem 24 is screwed in until the plunger of the gage makes contact with the end of the pin 27. The screwing in of the stem compresses the spring somewhat further and increases the tension in the chain correspondingly. Pressure is then applied to the specimen internally. Any suitable testing apparatus may be employed. One suitable form of apparatus is disclosed in the copending application of Aubrey et al. Serial No. 713,210 filed November 30, 1946, now Patent No. 2,578,031, for Method and Apparatus for Transversely Testing Cylindrical Members. As the internal pressure applied to the specimen increases, the stress causes the specimen to expand radially. The summation of the radial expansion is effective through the chain 14 to cause angular movement between the layers 11 and 12, increasing the separation between the ends of the levers pivoted to the ends of the chain. As a result, the pin 27 actuates the plunger 26 of the gage 25 and the total circumferential extension of the specimen may be read directly from the gage. By recording the extension produced by various pressure applied internally of the specimen, a complete stress-strain diagram may be obtained from which the yield strength will readily appear. If desired, the specimen may even be tested to failure. It is for this purpose that the frangible link 18 is provided. This link is designed to break under a tension less than the strength of the remaining links. It is thus necessary, after failure of the specimen, to replace only the frangible link. After the completion of a test, the keepers 22 are swung out of the way and bars of the link 18 are separated from the pivot screws 21. The stem 24 is then screwed out of the block 19 sufficiently to permit the levers 11 and 12 to be opened up to the extent necessary to facilitate removal of the chain, if the frangible link 18 remains intact. If the latter has been broken, the disconnection of the link 18 is necessary to facilitate replacement of the chain on the next specimen.

Figure 5:
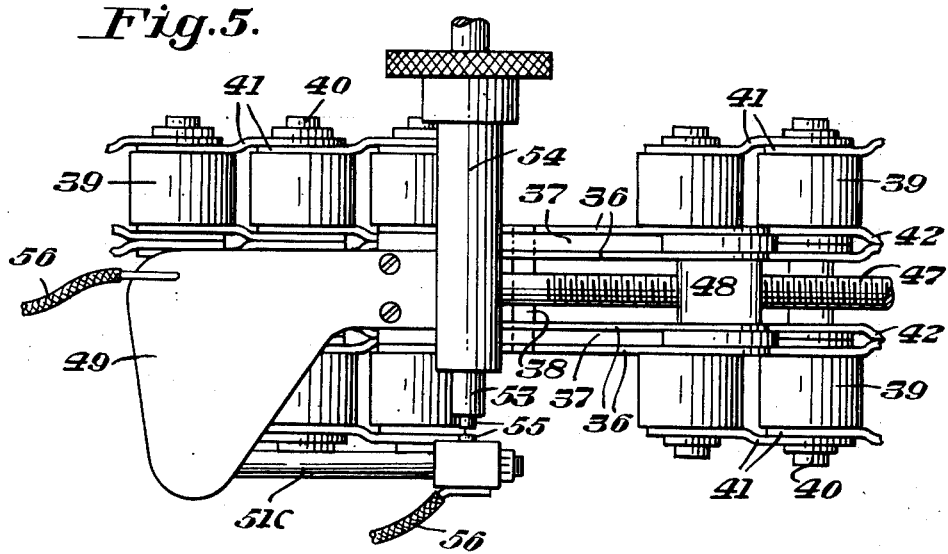
Figure 5 is a partial plan view thereof.

Figures 4 through 8 illustrate a somewhat different form of the invention adapted to indicate the contraction of a cylindrical specimen S' when subjected to external pressure. In this form of the invention, a chain 35 is adapted to be disposed around the specimen on the inside thereof and has its ends pivoted to levers 36 and 37, respectively. The lever 36 comprises two pairs of spaced bars and the lever 37 comprises a pair of spaced bars, one of which is disposed between each pair of bars comprising the lever 36. The levers are pivoted together intermediate their ends on a pin 38. The chain 35 comprises two rows of rollers 39 journaled on shafts 40. The shafts are connected by outer pivot links 41 and spaced pairs of inner pivot links 42. Each of the shafts 40 is provided with a coil spring 43. Each spring has extensions 44 engaging the shafts on opposite sides of that on which the spring is mounted. Each spring is so constructed and positioned as to urge the two shafts on opposite sides of that on which the spring is mounted outwardly relative to the latter. By this arrangement, the entire length of the chain is caused to fit snugly against the interior of the specimen S'. It will be appreciated that the springs 43 would cause the chain to curl up if its ends were free. Before the ends of the chain can be pivoted to the levers 36 and 37, the chain must be forcibly uncurled. Its tendency to recurl holds it firmly against the wall of the specimen.

A block 45 is pivoted to the inner end of the lever 37 on screws 46. The block 45 is bored to admit a screw shaft 47, the bore being sufficiently larger than the shaft to permit free movement of the latter. The shaft 47 is threaded through a tapped bore in the spacer block 48 secured to the inner ends of the bars forming lever 36.

Upper and lower frame plates 49 and 50 are secured to the top and bottom of the block 45 and project laterally therefrom. A bell-crank 51 includes a vertical shaft 51a journaled in the plates 49 and 50 and arms 51b and 51c extending therefrom. A coil spring 52 tends to urge the crank clockwise as viewed in Figure 6. The arm 51b has a ball head adapted to be engaged by a flat head on the shaft 47. The arm 51c co-operates with a pin 53 adjustable through a sleeve 54 secured to the top frame plate 49. The pin 53 actuates indicating means of any suitable type. It may, for example, actuate a dial gage in the same manner as the form of the invention first described. On the other hand, by providing contacts 55 on the arm 51c and the pin and suitable electric connections 56, the invention may be employed to control an electrical stress-strain recorder. In this case, the pin 53 is threaded in the sleeve 54 and means are provided for rotating the pin to retract its contact in accordance with the movement of the pen of the recorder. Electrical stress-strain recorders of this type are well known and require no detailed description.

It will be evident that, with the parts arranged as shown, contraction of the specimen S' resulting from the application of external pressure will cause the ends of the levers 36 and 37 to move together. The resulting movement of the pin 47 through the block 45 tends to swing the bell-crank 51 counterclockwise as viewed in Figure 6. This movement causes engagement of the contacts 55 or, if the pin 53 actuates a dial gage, would simply shift it to increase the gage reading. The shaft 47, of course, is adjusted before the start of a test to bring the contacts 55 as close together as possible without actually touching, to eliminate any lost motion and insure proper actuation of the recorder as soon as any perceptible contraction of the specimen has occurred.

It will be apparent from the foregoing that the invention provides a simple and accurate extensometer for cylindrical test specimens whereby the transverse yield strength of pipe or the like may readily be determined. The apparatus involved is simple and inexpensive in construction and is easy to use whether applied to the outside of the specimen for an internal pressure test or to the inside for an external pressure test. The invention is also adapted to serve as a pressure gage. From a knowledge of the transverse strength of a pipe or other cylindrical member, the interior pressure necessary to produce various degrees of expansion may be calculated and the indicating mechanism actuated by the extensometer, then calibrated to read pressure directly. It is unnecessary to add that the range of such a pressure gage would be limited by the maximum pressure for elastic expansion of the cylinder or pipe.

Although we have illustrated and described preferred embodiments of the invention, it will be recognized that changes in the construction disclosed may be made without departing from the spirit of the invention or the scope of the appended claims.

We claim:

1. An extensometer for cylindrical test specimens comprising a flexible member adapted to be disposed in circumferential engagement with a specimen, said member having anti-friction means disposed at intervals therealong positioned to engage the surface of the specimen and freely movable circumferentially of the specimen to inhibit frictional binding of said member against the specimen due to changes in the circumferential length of the specimen, a pair of levers pivoted together, one end of each lever being pivoted to an end of said member, a guide block pivoted to the other end of one of said levers, a pin pivoted to the other end of the other lever and slidable through said guide block, and indicating means controlled by said pin.

2. An extensometer for cyilndrical test specimens comprising a flexible member adapted to be disposed in circumferential engagement with a specimen, said member having anti-friction means disposed at intervals therealong positioned to engage the surface of the specimen and freely movable circumferentially of the specimen to inhibit frictional binding of said member against the specimen due to changes in the circumferential length of the specimen, a pair of levers pivoted together, one end of each lever being pivoted to an end of said member, a pair of links respectively pivoted to the ends of one of said levers, a pivot common to said links, a guide block on said pivot, and a pin pivoted to the other lever and slidable in said guide block for actuating an indicator.

3. An extensometer as defined by claim 2 characterized by one of said links being separable from said common pivot.

4. An extensometer as defined by claim 2 characterized by one of said links being separable from said common pivot, and movable means for holding said one of said links in engagement with said common pivot.

5. An extensometer as defined by claim 1 characterized by said indicating means comprising a dial gage mounted on said block having an actuating member adapted to be engaged by said pin.

6. An extensometer for cylindrical test specimens comprising a flexible member adapted to be disposed in circumferential engagement with a specimen, said member having anti-friction means disposed at intervals therealong positioned to engage the surface of the specimen and freely movable circumferentially of the specimen to inhibit frictional binding of said member against the specimen due to changes in the circumferential length of the specimen, a pair of levers pivoted together, one end of each lever being pivoted to an end of said member, a guide block pivoted to the other end of one of said levers, a pin pivoted to the other end of the other lever and slidable through said guide block, a plate extending laterally from said block, a bell crank pivoted on said plate and adapted to be actuated by said pin for controlling an indicating device.

7. An extensometer for cylindrical test specimens comprising a flexible member adapted to be disposed in circumferential engagement with a specimen, said member having anti-friction means disposed at intervals therealong positioned to engage the surface of the specimen and freely movable circumferentially of the specimen to inhibit frictional binding of said member against the specimen due to changes in the circumferential length of the specimen, and means for indicating changes in the distance between the ends of said member, said means including a pair of levers pivoted together and respectively connected with the ends of said member and a pin pivoted to one of them and slidably mounted on the other.

8. An extensometer for cylindrical test specimens comprising a flexible member adapted to contact a wall of a specimen at spaced points circumferentially and consisting of a length of roller chain to integrate local circumferential changes in size of the test specimen, a pair of levers pivoted together intermediate their ends, one end of one of said levers being pivoted to an end of said roller chain, one end of the other of said levers being pivoted to the other end of said roller chain, an indicator for indicating integrated changes in the circumference of the specimen, which changes are consequent to the summation of said local circumferential changes in size of the specimen, and means actuated by relative angular movement between said levers for actuating the indicator.

9. An extensometer for cylindrical test specimens comprising a chain adapted to be disposed in circumferential engagement with a specimen, a pair of levers pivoted together, one end of each lever being pivoted to an end of the chain, means for indicating changes in the circumferential length of the specimen and means operated by relative angular movement between the levers for actuating said means, the links of the chain being provided with springs tending to expand the loop formed when the ends of the chain are disposed adjacent each other.

RICHARD AUBREY, Jr.
VENICE J. AUBREY.

References Cited in the file of this patent

UNITED STATES PATENTS

| Number | Name | Date |
|---|---|---|
| 266,324 | Smith | Oct. 24, 1882 |
| 609,580 | Gordon | Aug. 23, 1898 |
| 783,562 | Zimmerman | Feb. 28, 1905 |
| 1,419,428 | Ulrich | June 3, 1922 |
| 1,482,162 | Streda | Jan. 29, 1924 |
| 1,482,392 | Frank | Feb. 5, 1924 |
| 1,500,629 | Levy | July 8, 1924 |
| 1,680,566 | Parker | Aug. 14, 1928 |
| 1,889,089 | De Giers | Nov. 29, 1932 |
| 1,958,864 | Richardson | May 15, 1934 |
| 1,986,729 | Johnston | Jan. 1, 1935 |
| 2,260,354 | Wallace | Oct. 28, 1941 |
| 2,290,529 | Black | July 21, 1942 |

FOREIGN PATENTS

| Number | Country | Date |
|---|---|---|
| 16,070 | Great Britain | Nov. 6, 1888 |